US012485503B2

United States Patent
Tsai et al.

(10) Patent No.: US 12,485,503 B2
(45) Date of Patent: Dec. 2, 2025

(54) MASS TRANSFERRING SYSTEM AND METHOD THEREOF

(71) Applicant: KULICKE AND SOFFA HI-TECH CO., LTD., New Taipei (TW)

(72) Inventors: Tsung-Lin Tsai, Taipei (TW); Lu-Min Chen, Taipei (TW)

(73) Assignee: Kulicke and Soffa Hi-Tech Co., Ltd., New Taipei (TW)

( * ) Notice: Subject to any disclaimer, the term of this patent is extended or adjusted under 35 U.S.C. 154(b) by 891 days.

(21) Appl. No.: 17/730,071

(22) Filed: Apr. 26, 2022

(65) Prior Publication Data

US 2023/0302575 A1 Sep. 28, 2023

(30) Foreign Application Priority Data

Mar. 22, 2022 (TW) .................. 111110648

(51) Int. Cl.
*B23K 26/08* (2014.01)
*B23K 26/57* (2014.01)
*B23K 101/40* (2006.01)

(52) U.S. Cl.
CPC ...... *B23K 26/0884* (2013.01); *B23K 26/0823* (2013.01); *B23K 26/57* (2015.10); *B23K 2101/40* (2018.08)

(58) Field of Classification Search
CPC ............ B23K 26/0884; B23K 26/0823; B23K 26/57; B23K 2101/40; B23K 26/0853; B23K 26/34; H01L 24/80; H01L 21/67144; H01L 24/75; H01L 2224/75261; H01L 2224/81224; H01L 2224/83224
See application file for complete search history.

(56) References Cited

U.S. PATENT DOCUMENTS

| 10,177,113 | B2 | 1/2019 | Ting et al. |
| 11,810,809 | B2 | 11/2023 | Liang et al. |
| 2019/0333898 | A1* | 10/2019 | Plößl .................. H10H 20/857 |
| 2020/0168498 | A1* | 5/2020 | Marinov ............ B23K 26/0673 |

(Continued)

FOREIGN PATENT DOCUMENTS

| CN | 101063824 A | 10/2007 |
| CN | 215377379 | 12/2021 |

(Continued)

OTHER PUBLICATIONS

Taiwanese Search Report for Taiwanese patent application No. 111110648 completed Feb. 10, 2023.

*Primary Examiner* — Jimmy Chou
*Assistant Examiner* — Thao Uyen Tran-Le
(74) *Attorney, Agent, or Firm* — Christopher M. Spletzer, Sr.

(57) ABSTRACT

A mass transferring system and the method thereof are provided. The system includes two platforms and a plurality of picking and placing units. When the mass transferring process is performed for one of the substrates, the replacing process and the aligning process are simultaneously executed for another one of the substrates, such that the mass transferring process and the replacing process can be performed at the same time. Compared with the conventional mass transferring processes, the efficiency of the mass transferring system and the method thereof according to the present invention can be increased by 90%.

4 Claims, 4 Drawing Sheets

(56) References Cited

U.S. PATENT DOCUMENTS

2020/0313035 A1\* 10/2020 Lee .................. H01L 24/29
2021/0028047 A1\* 1/2021 Na .................. B25J 15/0052
2022/0359249 A1 11/2022 Chen et al.
2023/0029828 A1\* 2/2023 Li .................. H01L 21/67121

FOREIGN PATENT DOCUMENTS

| CN | 114050207 | 2/2022 |
| TW | 201816980 | 5/2018 |
| TW | 202139344 | 10/2021 |
| TW | 202201773 | 1/2022 |
| TW | M630271 | 8/2022 |

\* cited by examiner

MASS TRANSFERRING SYSTEM AND METHOD THEREOF

BACKGROUND OF THE INVENTION

1. Field of the Invention

The present invention relates to a mass transferring system and the method thereof, in particular to a mass transferring system and the method thereof for transferring micro light-emitting diodes (Micro LED).

2. Description of the Prior Art

In recent years, a special type of LED was developed, namely "Micro LED", which can reduce the size of a LED to micrometer level. As micro-LED display panels have the advantages of high light emitting efficiency, long service lives and high resolution, etc., so micro-LED display panels have been considered the major solution of the next-generation display technology.

However, the conventional manufacturing process cannot be used to mass-produce micro LEDs because it is very hard to transfer millions of micro LEDs from a substrate to a displayer. Thus, "mass transfer" has become an important issue.

Currently, the major mass transferring methods includes the electrostatic adhesion method, the van der Waals force transfer printing method, the electromagnetic absorption method, etc. The electrostatic absorption method provided by LuxVue (United States of America), the van der Waals force transfer printing method provided by X-Celeprint (United States of America) and Industrial Technology Research Institute (ITRI, Taiwan) can precisely absorb a large amount of micro LEDs via electrostatic force, van der Waals force and electromagnetic force respectively so as to transfer the micro LEDs to a target substrate and accurately release the micro LEDs. However, the above three methods cannot solve the problem that the distances between the micro LEDs on the wafers are inconsistent, and the distances between the micro LEDs on the substrates are inconsistent.

Besides, another mass transferring method for micro LEDs is the patterning laser ablation method, which can generate uniform and stable laser light spots via the excimer laser in order to parallelly transfer micro LEDs to the substrates by the mask having a specific pattern, which can realize a high-precision optical array. However, although the method can achieve high efficiency, the efficiency of moving wafers (the replacing process and the aligning process for the substrates) become a limit. For example, the transferring process for a 6-inch wafer only takes 10 seconds, but performing the replacing process and the aligning process for the substrates take up to 20 seconds, which significantly decreases the overall transferring efficiency.

SUMMARY OF THE INVENTION

The inventor of the present invention has tried hard to improve currently available mass transferring methods in order to improve the shortcomings of prior art. After conducting research and experiments for many years, the inventor of the present invention successfully develops a mass transferring system and the method thereof.

The embodiments of the present invention provide a mass transferring system and the method thereof. The system includes two platforms and a plurality of picking and placing units. When the mass transferring process is performed for one of the substrates, the replacing process and the aligning process are simultaneously executed for another one of the substrates, such that the mass transferring process and the replacing process can be performed at the same time.

According to one embodiment of the present invention, the mass transferring method includes the following steps: providing a plurality of first substrates having a plurality of chips; providing a plurality of second substrates; disposing the first substrate on a source platform structure, wherein the source platform structure includes a plurality of replacing areas, a hollow area and a plurality of picking and placing units; disposing the second substrate on a target platform structure, wherein the target platform structure includes a plurality of replacing areas, a working area and a plurality of picking and placing units; moving any one of the first substrates from the replacing areas of the source platform structure to the hollow area thereof via the picking and placing unit, moving any one of the second substrates from the replacing area to the working area via the picking and placing unit, and emitting a laser to the first substrate moving to the hollow area so as to mass-transfer the chips to the second substrates on the working area; and moving the first substrate processed by the laser from the hollow area to the replacing area via the picking and placing unit, and simultaneously moving another one of the first substrates from another replacing area to the hollow area via another picking and placing unit, and emitting the laser to the first substrate on the hollow area in order to mass-transfer the chips to the second substrate on the working area.

In one embodiment of the present invention, the mass transferring method further includes the following steps: moving the second substrate where the chips are disposed from the working area to the replacing area via the picking and placing unit, and simultaneously moving another one of the second substrates from another replacing area to the working area via another picking and placing unit.

In one embodiment of the present invention, the laser is the excimer laser and the excimer laser is able to penetrate through the first substrates.

In one embodiment of the present invention, when the chips are mass-transferred from the first substrate disposed on the hollow area to the second substrate disposed on the working area, simultaneously, the replacing process and the aligning process are performed for the others of the first substrates and the others of the second substrates.

According to another embodiment of the present invention, the mass transferring system includes: a source platform structure and a target platform structure. The source platform structure includes a plurality of replacing areas, a hollow area and a plurality of picking and placing units. The hollow area is hollow and a laser is able to penetrate through the hollow area. The replacing areas are disposed on the outer side of the hollow area and the picking and placing units are able to pick and place the substrates where the chips are disposed on. The target platform structure includes a plurality of replacing areas, a working area and a plurality of picking and placing units. The replacing areas are disposed on an outer side of the working areas and the picking and placing units are able to pick and place the substrates where the chips are mass-transferred.

In one embodiment of the present invention, the picking and placing units of the source platform structure includes a common first axis positioning structure, a plurality of second axis positioning structures and a plurality of rotation positioning structures. The picking and placing units of the target platform structure includes a plurality of first axis positioning structures, a common second axis positioning structures, a plurality of third axis positioning structures and a plurality of rotation axis positioning structures. The first axis, the second axis and the third axis are perpendicular to each other.

In one embodiment of the present invention, the first axis of the common first axis positioning structure and the second axis of the common second axis positioning structure are decussated with each other in order to install the source platform structure and the target platform structure.

In one embodiment of the present invention, the source platform structure is a rectangle and the hollow area is disposed at the center of the rectangle. The quantity of the replacing areas and the picking and placing units is 2-4, and the replacing areas and the picking and placing units are disposed at any 2-4 corners of the rectangle.

In one embodiment of the present invention, the target platform structure is a rectangle and the working area is disposed at the center of the rectangle. The quantity of the replacing areas and the picking and placing units is 2-4, and the replacing areas and the picking and placing units are disposed the at any 2-4 corners of the rectangle.

Compared with the conventional mass transferring processes, the efficiency of the mass transferring system and the method thereof according to the embodiments of the present invention can be increased by 90%. For instance, transferring one 6-inch wafer only takes 10 seconds, and the time of performing the replacing process and the aligning process for the substrates can be reduced by 1-2 seconds, which can significantly increase the overall efficiency of the mass transferring process.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENT

In the following detailed description, for purposes of explanation, numerous specific details are set forth in order to provide a thorough understanding of the disclosed embodiments. It will be apparent, however, that one or more embodiments may be practiced without these specific details. The purpose of the drawings used is only for illustration and auxiliary description, and may not be the real scale and precise configuration after the implementation of the present invention. Therefore, the proportion and configuration relationship of the attached drawings should not be used to interpret or limit the scope of implementing the present invention.

Figure 1:
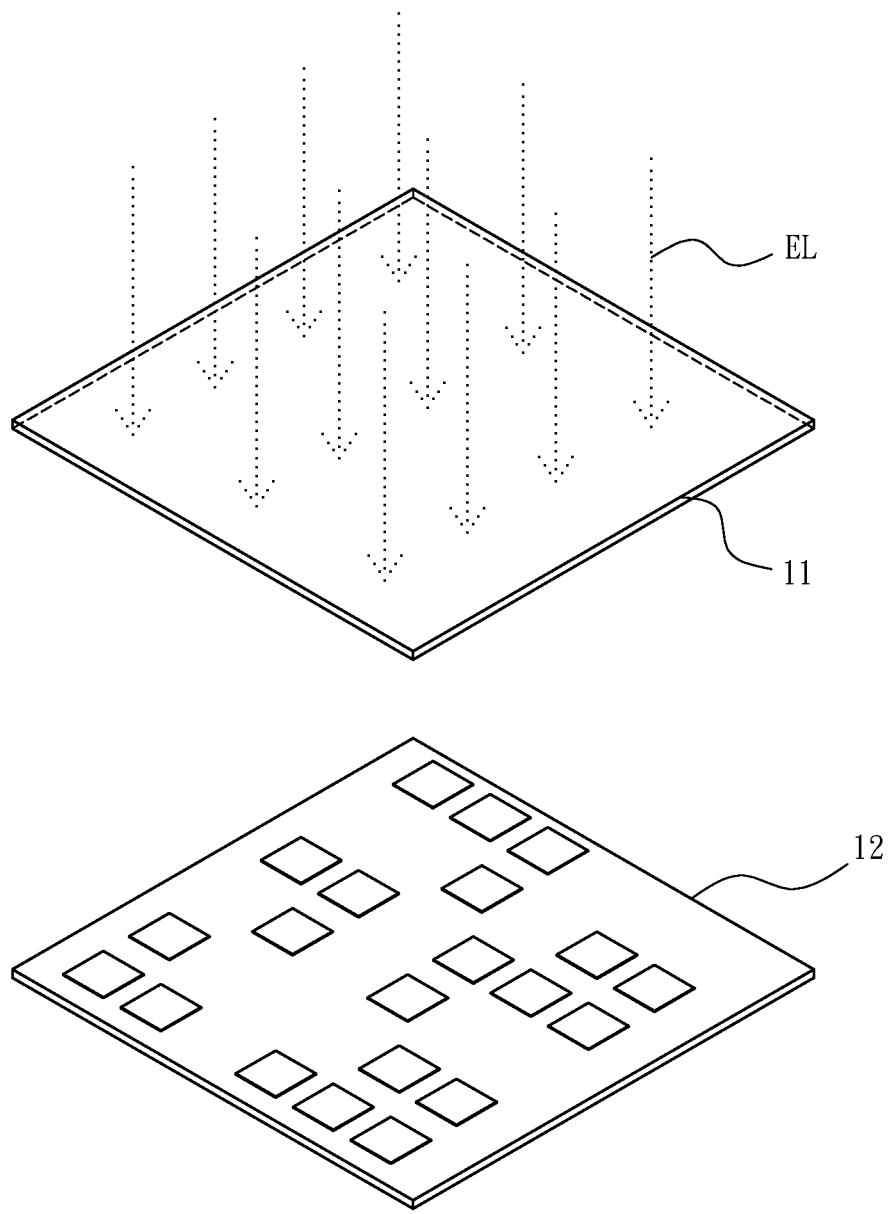
FIG. 1 is the schematic view of performing the mass transferring process via the excimer laser in accordance with one embodiment of the present invention.

Please refer to FIG. 1, which is the schematic view of performing the mass transferring process via a laser in accordance with one embodiment of the present invention. As shown in FIG. 1, the first substrate 11 has a plurality of chips (not shown in the drawings) and the chips are mass-transferred to the second substrate 12 via a laser. The type of the laser is not limited; for example, the laser may be the excimer laser (EL).

The type of the first substrate 11 is not limited; for example, the first substrate 11 may be a glass substrate, a silicon substrate, a sapphire substrate, a substrate having an integrated circuit or other substrates which can be penetrated by the excimer laser. The size of the first substrate 11 is not limited; for instance, the size of the first substrate 11 may be 6 inches, 8 inches or have other proper sizes. The type of the second substrate 12 is not limited; for instance, the second substrate 12 may be a GaAs substrate, a substrate used for a display or other proper types of substrates. In one embodiment, the chips of the first substrate 11 may include the LED (light-emitting diode) chips with the three colors, RGB. In one embodiment, the excimer laser EL can mass-transfer the chips with a specific pattern from the first substrate 11 to the second substrate 12 via a mask with the same pattern.

[Dual-Platform System]

Figure 2:
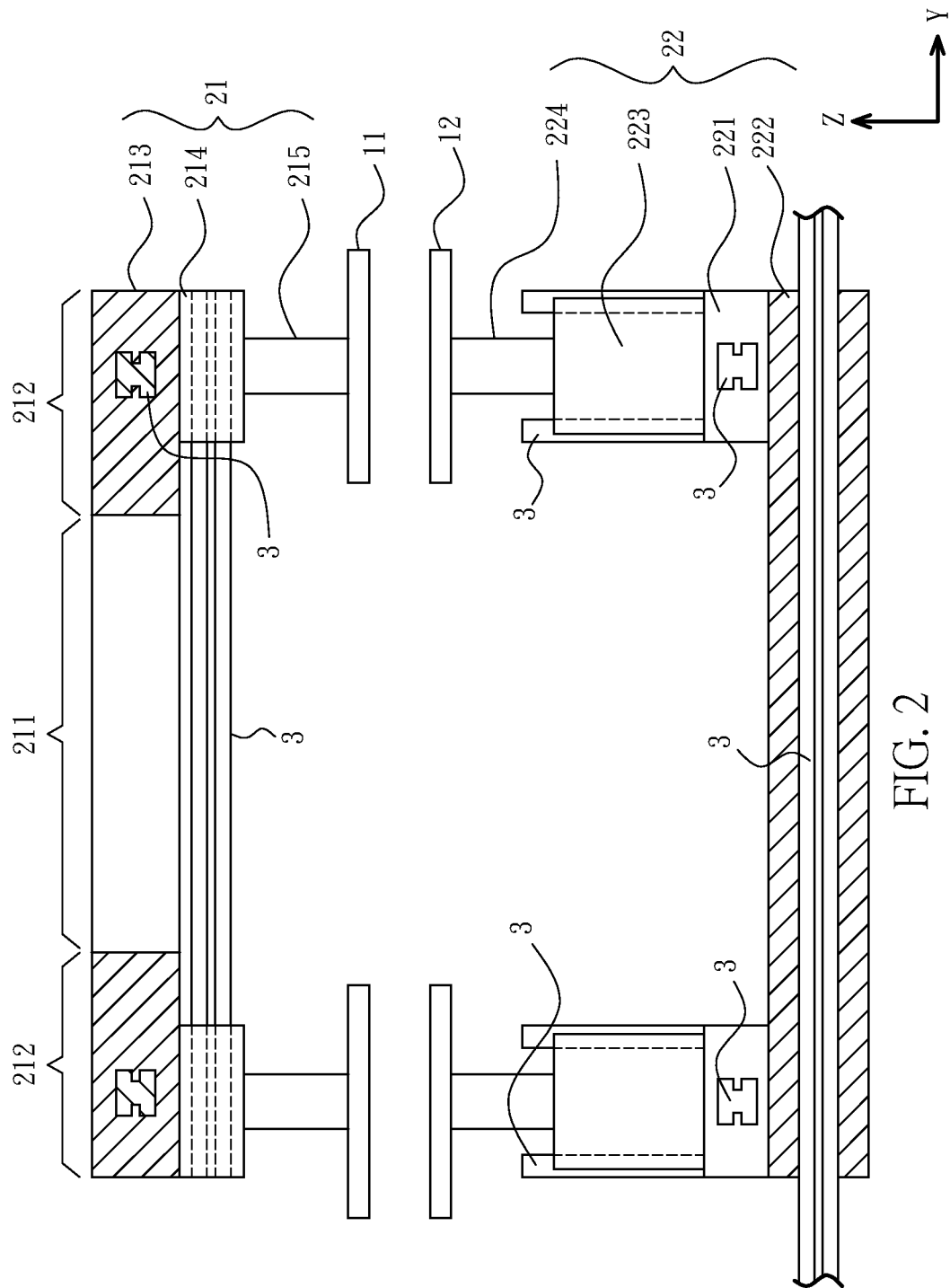
FIG. 2 is the schematic view of the dual-platform system in accordance with one embodiment of the present invention.

Please refer to FIG. 2, which is the schematic view of the dual-platform system in accordance with one embodiment of the present invention. As shown in FIG. 2, the dual-platform system includes a source platform structure 21 and a target platform structure 22. The first substrate 11 is disposed on the source platform structure 21 and the second substrate 12 is disposed on the target platform structure 22. The appearances, shapes, sizes and materials of the source platform structure 21 and the target platform structure 22 are not limited as long as the following mass transferring process can be successfully performed. In one embodiment, the source platform structure 21 and the target platform structure 22 may be rectangular.

[Source Platform System]

The source platform structure 21 includes a plurality of replacing areas 212, a hollow area 211 and a plurality of picking and placing units. The hollow area 211 is hollow and the laser can pass through the hollow area 211 and reach the first substrate 11. The replacing area 212 is the area for performing the replacing process and the aligning process for the substrates. The relative position between the hollow area 211 and the replacing area 212 is not limited. However, in order to enhance the efficiency of the mass transferring process, it is preferred that the replacing area 212 is at the outer side of the hollow area 211. In one embodiment, when the source platform structure 21 is a rectangle, the hollow area 211 is at the center of the rectangle. The quantity of the picking and placing units is 2-4; the picking and placing units may be at any 2-4 corners of the rectangle.

Regarding the picking and placing units of the source platform structure 21, the appearances, shapes, sizes, materials and structures of the picking and placing units are not limited as long as the picking and placing units can pick and place the first substrate 11, move the first substrate 11 between the replacing area 212 and the hollow area 211 and perform the positioning process for the first substrate 11. In one embodiment, the picking and placing units may be suckers or robotic arms. The way of the picking and placing units for picking and placing the first substrate 11 is not limited; for example, the picking and placing units may be the suckers for sucking the first substrate 11 or may be the robotic arms for grabbing the first substrate 11 or may have other structures capable of picking and placing the first substrate 11. In one embodiment, the picking and placing unit includes at least the first axis positioning structure 213 and the second axis positioning structure 214. In one embodiment, the picking and placing unit includes at least the first axis positioning structure 213, the second axis positioning structure 214 and the third axis positioning structure. In one embodiment, the picking and placing unit includes at least the rotation axis positioning structure 215. The first axis positioning structure 213 allows the picking and placing unit to move along the first axis (e.g., the X-axis) and achieve positioning. The second axis positioning structure 214 allows the picking and placing unit to move along the second axis (e.g., the Y-axis) and achieve positioning. The third axis positioning structure allows the picking and placing unit to move along the third axis (e.g., the Z-axis) and achieve positioning. The rotation axis positioning structure 215 allows the picking and placing unit to achieve positioning by rotating. In one embodiment, the positioning structures of the picking and placing unit can move and achieve positioning by the rails 3 (the X-axis is not shown in the drawings; the direction of the X-axis is perpendicular to the surface of the drawing; in other words, the X-axis is perpendicular to the Y-Z plane).

In one embodiment, the picking and placing units of the source platform structure 21 includes at least one common positioning structure. The direction (axis) of the common positioning structure is not limited. For instance, the common positioning structure may be a common first axis positioning structure 213. This is to say, the picking and placing units of the source platform structure 21 in the direction of the first axis (e.g., the X-axis) move together and achieve positioning.

In one embodiment, so as to further enhance the efficiency of the mass transferring process, it is preferred that the picking and placing unit of the source platform structure 21 includes the common first axis positioning structure 213, the second axis positioning structure 214 and the rotation axis positioning structure 215. In addition, the first axis, the second axis and the third axis are perpendicular to each other. In one embodiment, the first axis is the X-axis, the second axis is the Y-axis and the third axis is the Z-axis.

[Target Platform System]

The target platform structure 22 includes a plurality of replacing areas 212, a working area and a plurality of picking and placing units. The working area is disposed at the position corresponding to that of the hollow area 211. In this way, the laser passing through the hollow area 211 can reach the working area. In one embodiment, the working area is disposed directly below the hollow area 211. The replacing area 212 is the area of performing the replacing process and the aligning process for the substrates. The relative position between the working area and the replacing area 212 is not limited; however, it is preferred that the replacing area 212 is disposed at the outer side of the working area with a view to enhance the efficiency of the mass transferring process. In one embodiment, when the target platform structure 22 is a rectangle, the working area is disposed at the center of the rectangle. The quantity of the picking and placing units is 2-4. The picking and placing units are disposed at any 2-4 corners of the rectangle.

Regarding the picking and placing units of the target platform structure 22, the appearances, shapes, sizes, materials and structures of the picking and placing units are not limited as long as the picking and placing units can pick and place the second substrate 12, move the second substrate 12 between the replacing area 212 and the working area and perform the positioning process for the second substrate 12. In one embodiment, the picking and placing units may be suckers or robotic arms. The way of the picking and placing units for picking and placing the second substrate 12 is not limited; for example, the picking and placing units may be the suckers for sucking the second substrate 12 or may be the robotic arms for grabbing the second substrate 12 or may have other structures capable of picking and placing the second substrate 12. In one embodiment, the picking and placing unit includes at least the first axis positioning structure 221 and the second axis positioning structure 222. In one embodiment, the picking and placing unit includes at least the first axis positioning structure 221, the second axis positioning structure 222 and the third axis positioning structure 223. In one embodiment, the picking and placing unit includes at least the rotation axis positioning structure 224. The first axis positioning structure 221 allows the picking and placing unit to move along the first axis (e.g., the X-axis) and achieve positioning. The second axis positioning structure 222 allows the picking and placing unit to move along the second axis (e.g., the Y-axis) and achieve positioning. The third axis positioning structure 223 allows the picking and placing unit to move along the third axis (e.g., the Z-axis) and achieve positioning. The rotation axis positioning structure 224 allows the picking and placing unit to achieve positioning by rotating. In one embodiment, the positioning structures of the picking and placing unit can move and achieve positioning by the rails 3.

In one embodiment, the picking and placing unit of the target platform structure 22 includes at least one common positioning structure and the direction (axis) of the common positioning structure is not limited. For example, the common positioning structure may be the common second axis positioning structure 222. In other words, the picking and placing units of the target platform structure 22 in the direction of the second axis (e.g., the Y-axis) move together and achieve positioning.

In one embodiment, so as to further enhance the efficiency of the mass transferring process, it is preferred that the picking and placing unit of the target platform structure 22 includes the first axis positioning structure 221, the common second axis positioning structure 222, the third axis positioning structure 223 and the rotation axis positioning structure 224. In addition, the first axis, the second axis and the third axis are perpendicular to each other. In one embodiment, the first axis is the X-axis, the second axis is the Y-axis and the third axis is the Z-axis.

Regarding the source platform structure 21 and the target platform structure 22, the arrangement of the two structures is not limited as long as the laser passing through the hollow area 211 can reach the working area. In one embodiment, the source platform structure 21 may be disposed on the upper side and the target platform structure 22 may be disposed on the lower side. In one embodiment, the source platform structure 21 and the target platform structure 22 can be installed by making the axis direction of the common positioning structure of the source platform structure 21 be parallel to the axis direction of the common positioning structure of the target platform structure 22. For instance, when the axis of the common positioning structure of the source platform structure 21 is X-axis, the axis of the common positioning structure of the target platform structure 22 is also X-axis. It is preferred that the first axis of the common first axis positioning structure 213 of the source platform structure 21 and the second axis of the common second axis positioning structure 222 of the target platform structure 22 are decussated with each other in order to install the source platform structure and the target platform structure. For instance, when the axis of the common positioning structure of the source platform structure 21 is X-axis, the axis of the common positioning structure of the target platform structure 22 is Y-axis.

[Mass Transferring Method]

Figure 3A:
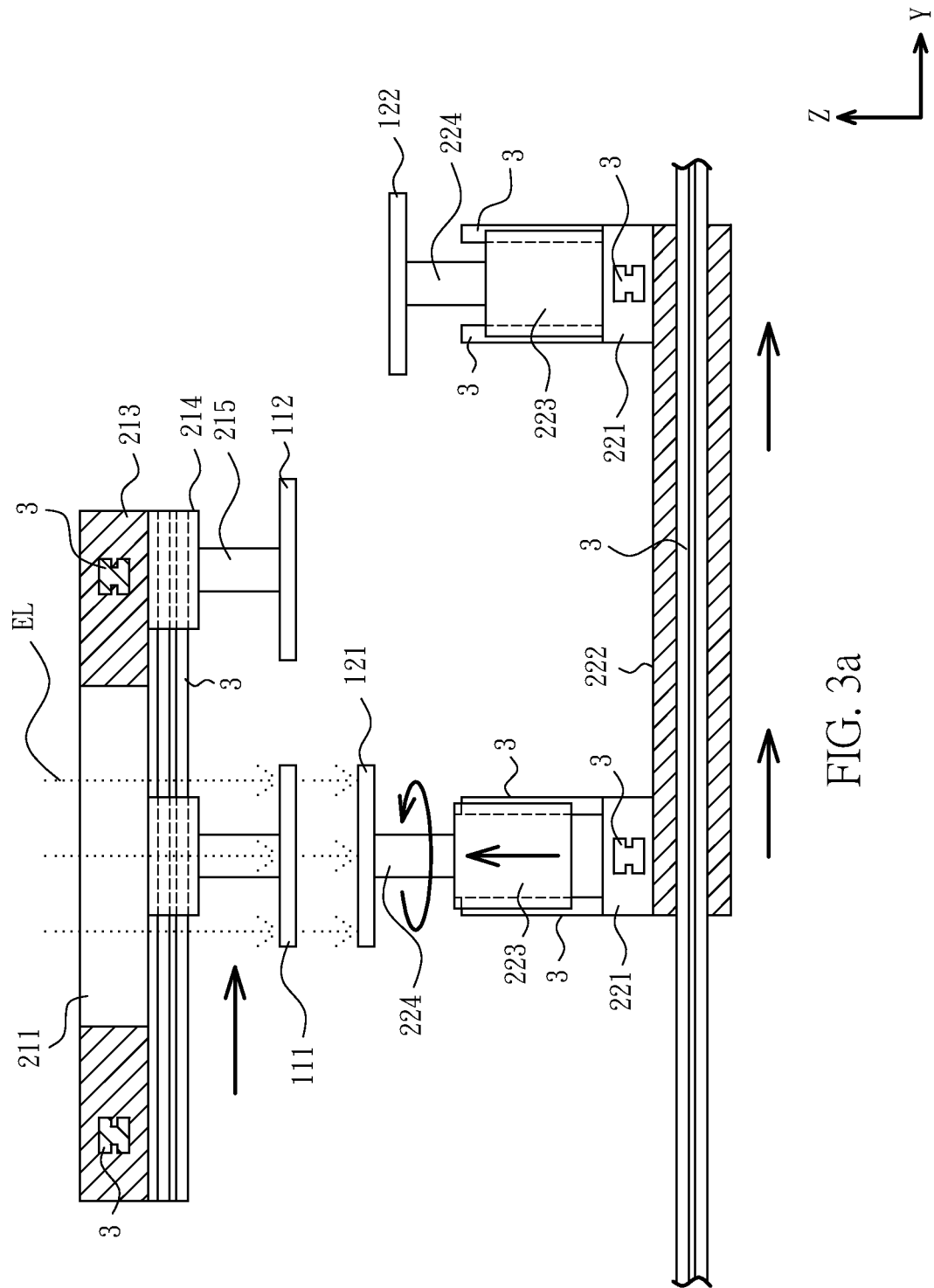
FIG. 3a and FIG. 3b are the schematic views of performing the mass transferring process via the excimer laser by the dual-platform system in accordance with one embodiment of the present invention.
Figure 3B:
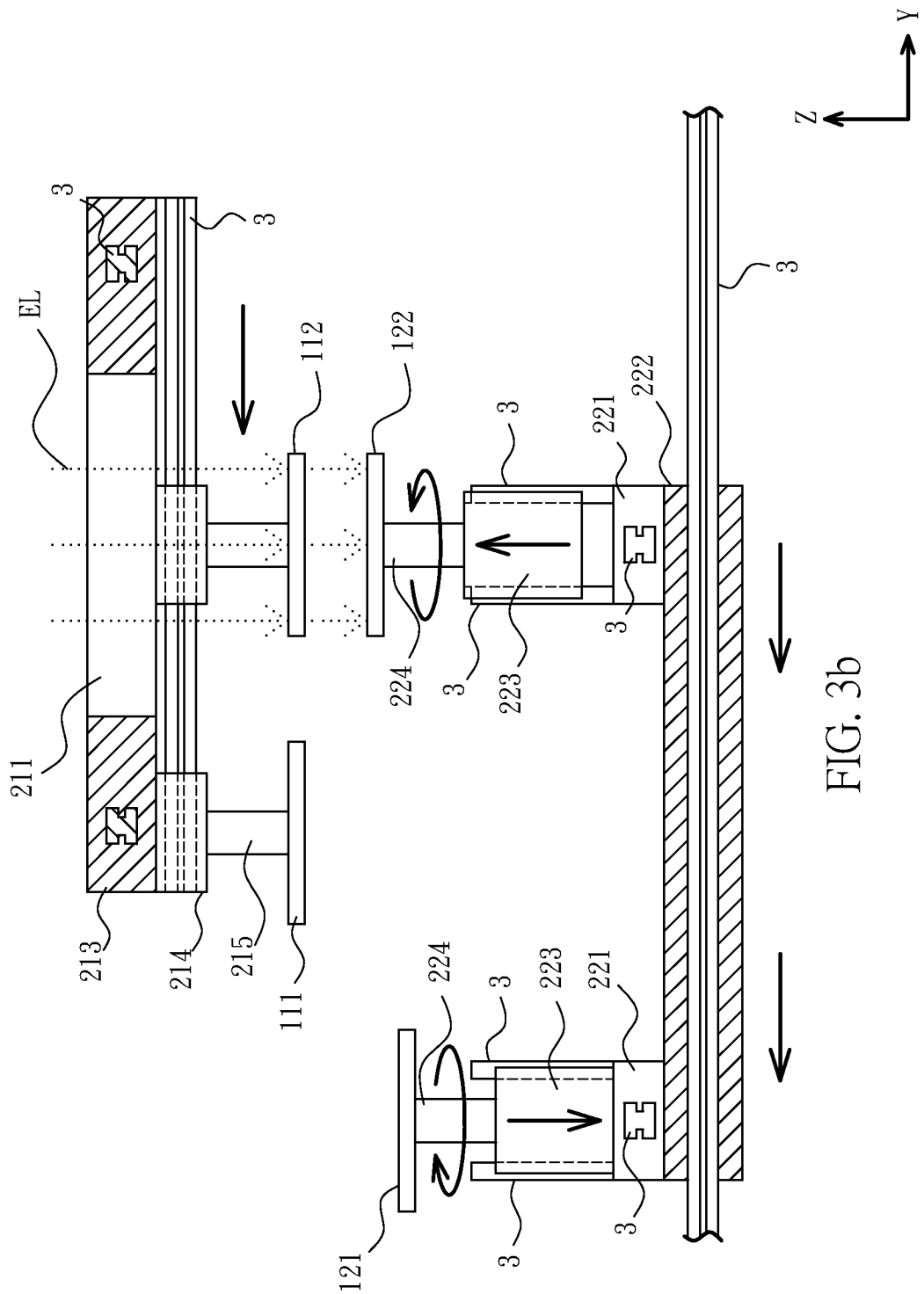

Please refer to FIG. 3a and FIG. 3b, which are the schematic views of performing the mass transferring process via the excimer laser by the dual-platform system in accordance with one embodiment of the present invention. In one embodiment, each of the source platform structure 21 and the target platform structure 22 includes two picking and placing units. The two picking and placing units of the source platform structure 21 pick and place a first one of the first substrates 111 and a second one of the first substrates 112, respectively. The two picking and placing units of the target platform structure 22 pick and place a first one of the second substrates 121 and a second one of the second substrates 122, respectively. The above four picking and placing units are at the replacing areas 212 corresponding thereto respectively before the mass transferring process is executed.

As shown in FIG. 3a, when the mass transferring process is performed, the first step is that one of the picking and placing units of the source platform structure 21 moves the first one of the first substrates 111, having the chips, from one of the replacing areas 121 to the hollow area 211, and then the positioning process is executed. Then, one of the picking and placing units of the target platform structure 22 moves the first one of the second substrates 121, serving as the target where the chips are transferred, from one of the replacing areas 212 to the position directly below the hollow area 211 (i.e., the working area). Afterward, the excimer laser EL is emitted to pass through the hollow area 211 to reach the first one of the first substrates 111, such that the chips on the first one of the first substrates 111 are mass transferred to the first one of the second substrates 121.

As shown in FIG. 3b, after the first one of the first substrates 111 is processed by the laser, one of the picking and placing units of the source platform structure 21 moves the first one of the first substrates 111 from the hollow area 211 to the replacing area 212, and then the replacing process and the aligning process are performed (i.e., feeding and retrieving). Meanwhile, one of the picking and placing units of the target platform structure 22 moves the first one of the second substrates 121 where the chips are disposed from the working area to the replacing area 212, and then the replacing process and the aligning process are performed. In the meanwhile, another one of the picking and placing units of the source platform structure 21 moves the second one of the first substrates 112 where the chips are disposed from another replacing area 212 to the hollow area 211 and then the positioning process is executed. Meanwhile, another one of the picking and placing units of the target platform structure 22 moves the second one of the second substrates 122, serving as the target where the chips are transferred, from another replacing area 212 to the position directly below the hollow area 211 (i.e., the working area). Afterward, the excimer laser is emitted to pass through the hollow area 211 and reach the second one of the first substrates 112, such that the chips on the second one of the first substrates 112 are mass-transferred to the second one of the second substrates 122.

FIG. 3a and FIG. 3b describe the embodiment of mass transferring the chips from the first one of the first substrates 111 to the first one of the second substrates 121, and mass transferring the chips from the second one of the first substrates 112 to the second one of the second substrates 122. However, the above embodiment is just for example instead of limiting the scope of the mass transferring method of the present invention. For instance, the excimer laser EL can pass through a mask with a specific pattern first. Then the chips, with a specific shape, on the first one of the first substrates 111 and the second one of the first substrates 112, which the specific shape, are orderly mass transferring to the first one of the second substrates 121. Afterward, the first one of the second substrates 121 is replaced by the second one of the second substrates 122 and so on.

In one embodiment, the maximal moving speed of the platforms of the mass transferring system without load is 250 mm/s~1000 mm/s, preferably 500 mm/s.

In one embodiment, the maximal scanning speed of the mass transferring system performing the mass transferring process is 100 mm/s~500 mm/s, preferably 200 mm/s.

In one embodiment, the repeatability of the mass transferring system is ±0.4 µm~±1.0 µm, preferably ±0.7 µm.

In one embodiment, the resolution of the camera of the mass transferring system is 0.3 µm~1.0 µm, preferably 0.6 µm.

In one embodiment, the laser transferring error of the mass transferring system is ±1 µm~±5 µm, preferably ±3 µm.

In one embodiment, the final transferring error of the mass transferring system is ±3 µm~±8 µm, preferably ±5 µm.

In one embodiment, the maximal transferring ability (area) of the mass transferring system is 20 $cm^2$/s~50 $cm^2$/s, preferably 32 $cm^2$/s.

To sum up, the system according to the embodiments of the present invention is a dual-platform system including a plurality of picking and placing units. When the mass transferring process is performed for one of the substrates, the replacing process and the aligning process are simultaneously executed for another one of the substrates, such that the mass transferring process and the replacing process can be performed at the same time. Compared with the conventional mass transferring processes, the efficiency of the mass transferring system according to the embodiments of the present invention can be increased by 90%.

The above disclosure is related to the detailed technical contents and inventive features thereof. Those skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A mass transferring method, comprising:
providing a plurality of first substrates having a plurality of chips;
providing a plurality of second substrates;
disposing one of the plurality of first substrates on a source platform structure, wherein the source platform structure comprises a plurality of replacing areas, a hollow area and a plurality of picking and placing units;
disposing one of the plurality of second substrates on a target platform structure, wherein the target platform structure comprises a plurality of replacing areas, a working area and a plurality of picking and placing units;
moving the one of the plurality of first substrates from one of the plurality of replacing areas of the source platform structure to the hollow area thereof via one of the plurality of picking and placing units of the source platform structure, moving the one of the plurality of second substrates from one of the plurality of replacing areas of the target platform structure to the working area via one of the plurality of picking and placing units of the target platform structure, and emitting a laser to the one of the plurality of first substrates so as to mass-transfer the plurality of chips of the one of the plurality of first substrates to the one of the plurality of second substrates in the working area; and moving the one of the plurality of first substrates processed by the laser from the hollow area to the one of the plurality of replacing areas of the source platform structure via the one of the plurality of picking and placing units of the source platform structure, and simultaneously moving another one of the plurality of first substrates from another one of the plurality of replacing areas of the source platform structure to the hollow area via another one of the plurality of picking and placing units of the source platform structure, and emitting the laser to the another one of the plurality of first substrates in the hollow area in order to mass-transfer the plurality of chips of the another one of the plurality of first substrates to another one of the plurality of second substrates in the working area.

2. The mass transferring method of claim 1, further comprising: moving the one of the plurality of second substrates, after the mass-transfer the plurality of chips of the one of the plurality of first substrates to the one of the plurality of second substrates, to the one of the plurality of replacing areas of the target platform structure via the one of the plurality of picking and placing units of the target platform structure, and simultaneously moving the another one of the plurality of second substrates from another one of the plurality of replacing areas of the target platform structure to the working area via another one of the plurality of picking and placing units of the target platform structure.

3. The mass transferring method of claim 1, wherein the laser is an excimer laser and the excimer laser is able to penetrate through each of the plurality of first substrates.

4. The mass transferring method of claim 1, wherein when the plurality of chips of the one of the plurality of first substrates are mass-transferred from the one of the plurality of first substrates disposed in the hollow area to the one of the plurality of second substrates disposed in the working area, simultaneously, a replacing process and an aligning process are performed for the another one of the plurality of first substrates and the another one of the plurality of second substrates.

* * * * *